March 17, 1936.  J. FLAWS, JR  2,034,653
MACHINE FOR MAKING GRIDS
Filed April 23, 1932   5 Sheets-Sheet 5
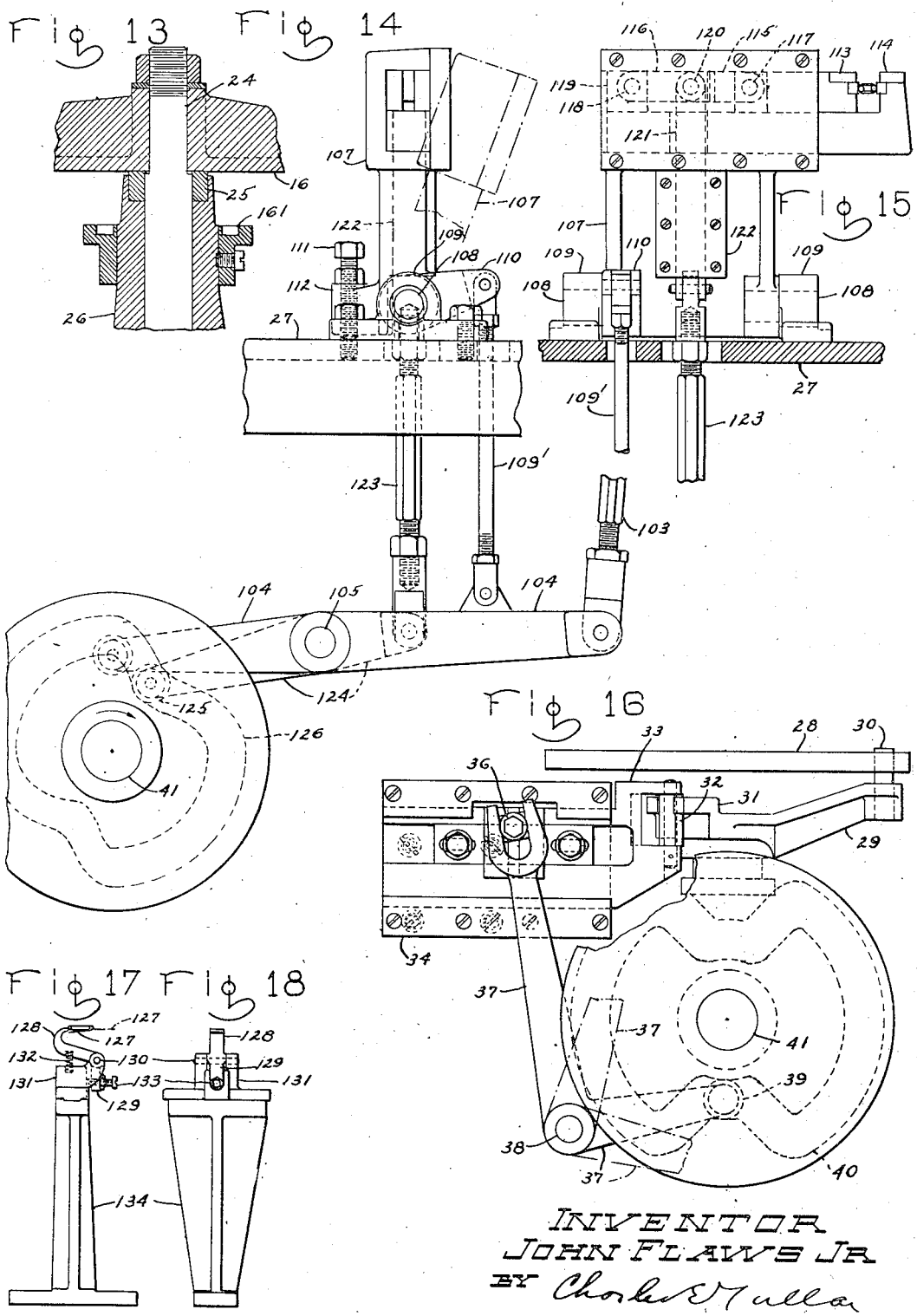
INVENTOR
JOHN FLAWS JR
BY Charles Mulla
His Attorney Patented Mar. 17, 1936

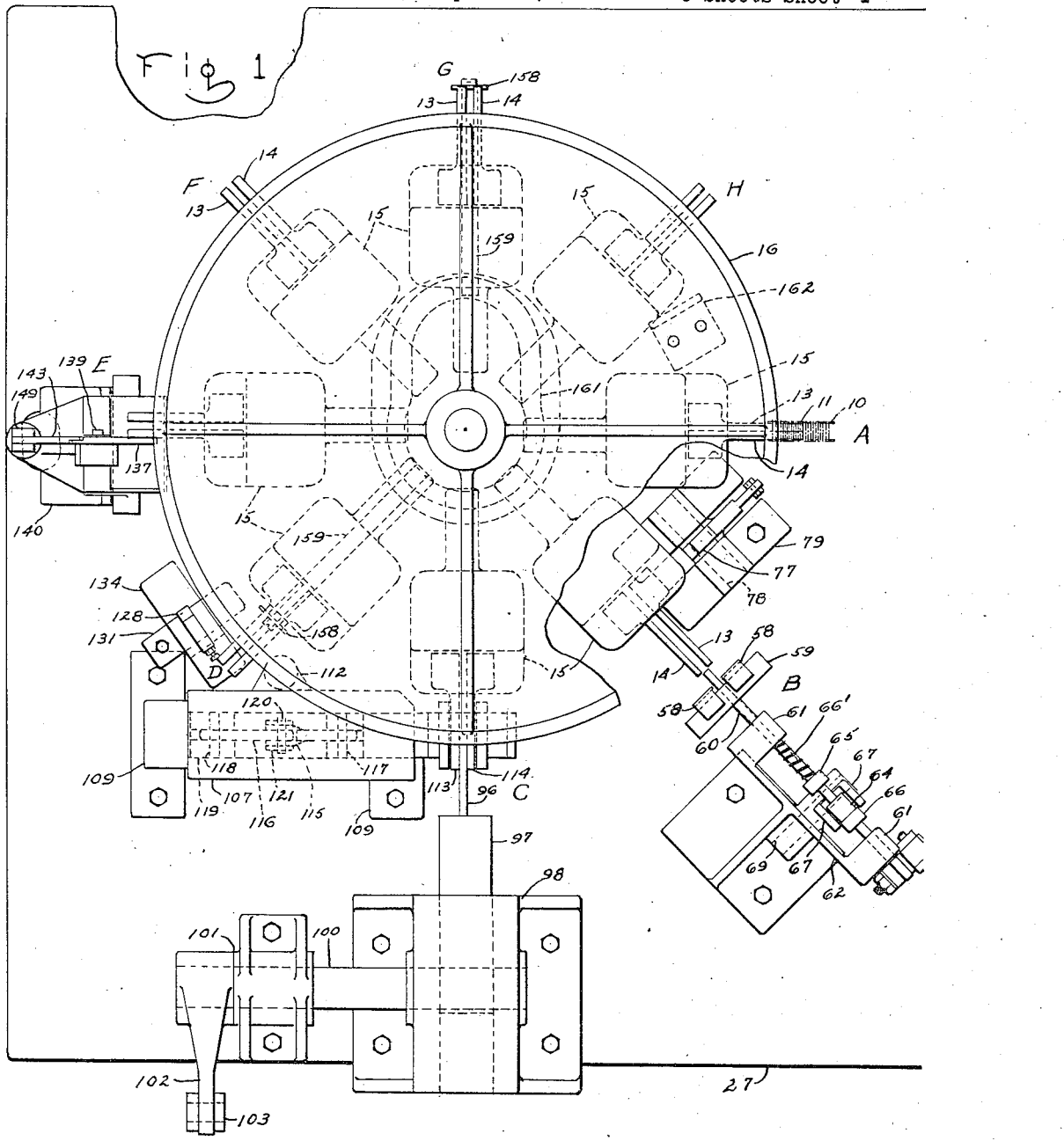

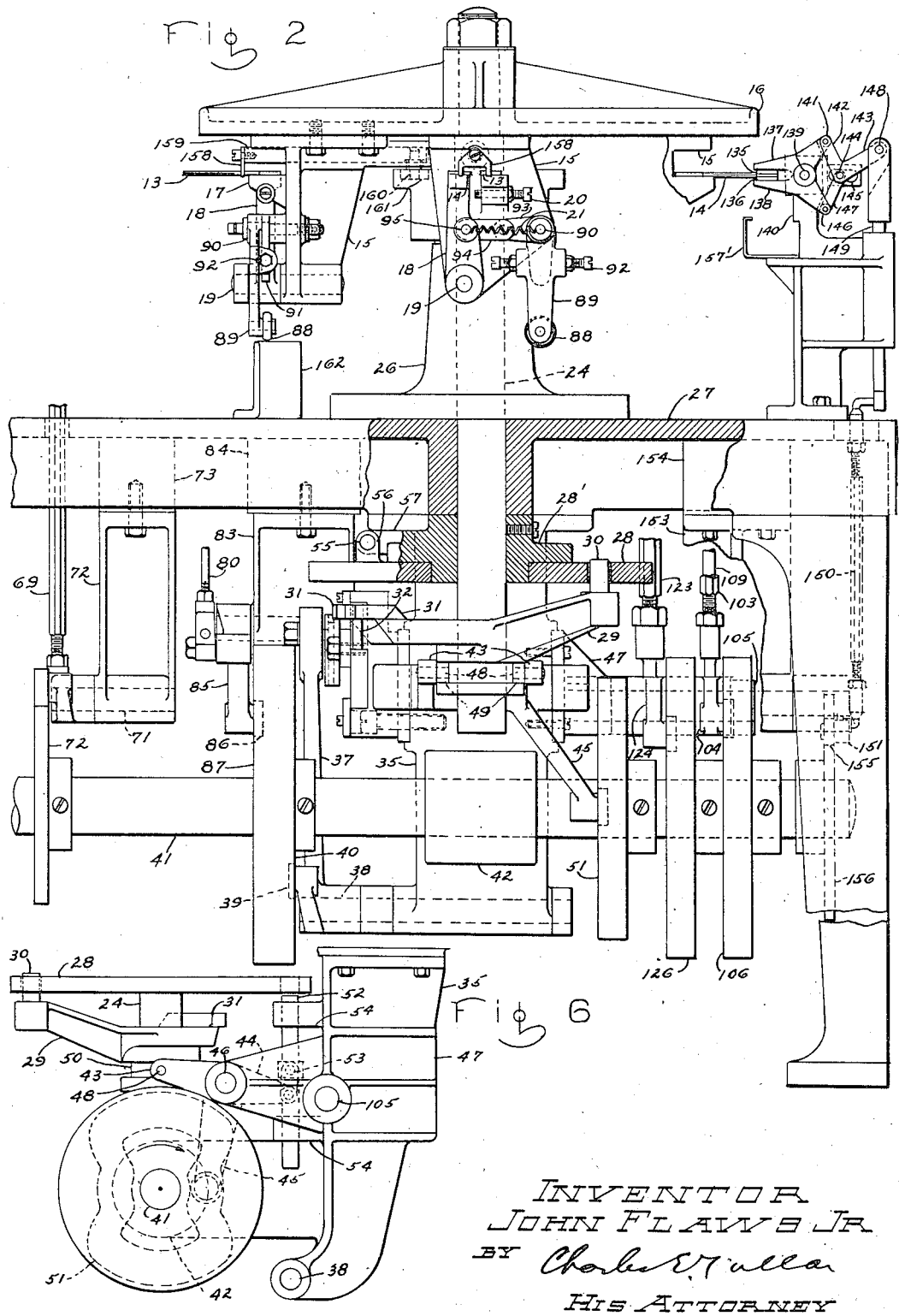

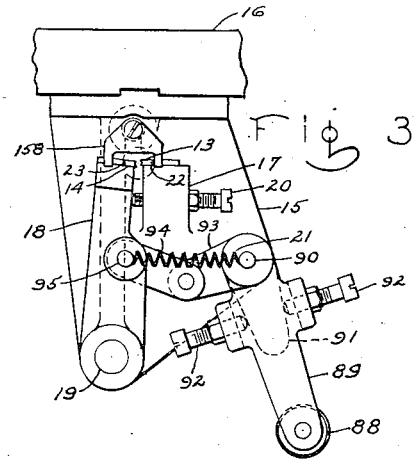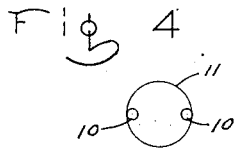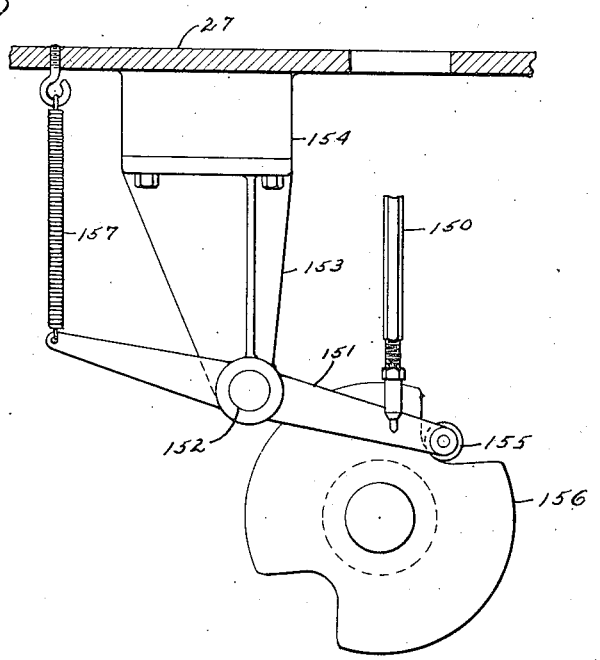

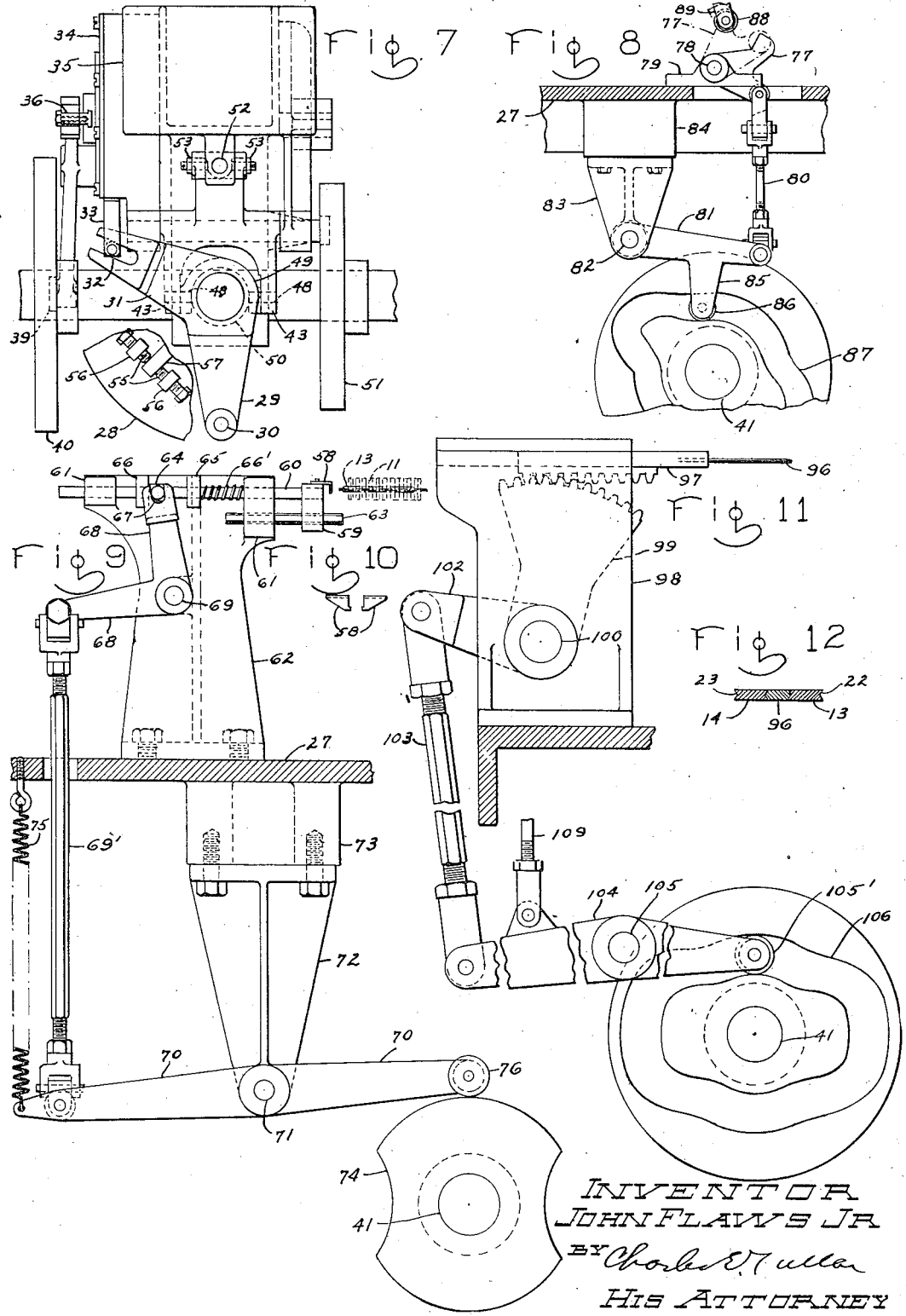

2,034,653

UNITED STATES PATENT OFFICE 2,034,653

MACHINE FOR MAKING GRIDS

John Flaws, Jr., Cleveland Heights, Ohio, assignor to General Electric Company, a corporation of New York Application April 23, 1932, Serial No. 607,143

13 Claims. (Cl. 140—71)

My invention relates to machines for making grids comprising a plurality of supporting wires or side rods which serve to support a coil and hold the individual turns thereof in a fixed position with relation to each other. More specifically my invention relates to machines comprising means for altering the shape of such a grid from the initial cylindrical to a flat or other desired shape.

The object of my invention is to provide a machine which is entirely automatic in operation and which will stretch and size the grid so that it is completely finished after ejection from said device. Such grids are used ordinarily in the construction of electric discharge tubes, for which purpose they are delivered ready for mounting. The grids produced by my machine are set in a definite shape, due to the stretching and sizing, so that they will not lose that shape in subsequent handling and usage. Other features and advantages of my invention will appear from the following description of species thereof.

The grid winding machine preferably used in conjunction with my present invention comprises a mechanism for continuously feeding forward the supporting wires and a device for winding the wires to be coiled around the supporting wires. The supporting wires are notched by a disc, the wire to be coiled is laid in the notches, and then the notches are closed up, imprisoning the wire therein. Means are also provided for arresting the feeding of the wire to be coiled during a part of the forward motion of the support wires, to provide for legs at the ends of the grids after they are cut to length. As the grid structure, comprising continuous lengths of wires which support at intervals helices of wire wound thereabout, issues from the end of the machine, it passes over a mandrel comprising the spreading means of my invention. When a part of the helix of wire at the end of said grid structure has passed over the end of said spreading mandrel, means provided on the grid machine act to cut the support wires at a point between the foremost helix of wire and the adjacent helix. Said cutting-off operation leaves a grid of the correct length on the mandrel of my present device, which, as hereinafter described, finishes the grid and delivers it ready for mounting.

In the drawings Fig. 1 is a plan view of a device comprising my invention, and Fig. 2 is a fragmentary elevation thereof; Fig. 3 is a detailed view of an indexing head; Figs. 4 and 5 are end views of grids; Fig. 6 is an elevation of an index lock mechanism, and Fig. 7 is a plan view thereof; Fig. 8 is a detailed view of a grid spreader; Fig. 9 is an elevation of a grid locator and Fig. 10 is a front view of a detail thereof; Fig. 11 is a detailed view of a mandrel spacer; Fig. 12 is a detailed sectional view of a part of said mandrel spacer; Fig. 13 is a fragmentary elevation showing the mounting of the turret; Fig. 14 is a side view in detail of a side rod squeeze, and Fig. 15 is a front elevation thereof; Fig. 16 is a detailed view of the indexing means; Fig. 17 is a side elevation of a grid wire wiper, and Fig. 18 is a front elevation thereof; and Fig. 19 is a detailed view of the grid wire cutoff operating mechanism.

Referring to Fig. 1, at position A, a grid comprising side rods 10 and a coil of wire 11 (Fig. 4) wound about and affixed thereto, is placed upon a mandrel comprising fingers 13, 14. Said mandrel 13, 14 is part of an indexing head comprising a body portion 15 (Figs. 2 and 3) which is mounted on a turret 16. The illustrated form of my invention comprises eight indexing heads shown at the positions A to H inclusive.

Referring to Figs. 2 and 3, the finger 13 is mounted on a lug 17 of the body 15, while the finger 14 is mounted on an arm 18 pivotally mounted on a pin 19 which is mounted in the body 15. At position A, the fingers 13, 14 are in the closed position as shown in Fig. 3, the arm 18 being held against a bolt 20, mounted in the lug 17, by a spring 21. The side rods 10 of the grid rest in V-shaped grooves 22 and 23 of the fingers 13 and 14.

The turret 16 with the heads 15 now indexes to position B. Said turret 16 is mounted on a vertical shaft 24 (Fig. 13) and rotates on a thrust bearing 25 mounted in a post 26 which is mounted on a table 27 (Fig. 2). The turret 16 is indexed through the shaft 24 and a plate 28, (Figs. 2, 6 and 7) mounted on a collar 28' in turn mounted on shaft 24, by an arm 29 of an indexing lever carrying a pin 30 which engages the plate 28 through one of eight equally spaced holes therein. Said indexing lever is rotatably mounted on the shaft 24 and comprises another arm 31 which is rotated by a pin 32 (Fig. 16) mounted in a slide 33 which reciprocates in a holder 34 mounted on a support 35 (Figs. 2 and 7) carried by the table 27. The slide 33 is reciprocated through a pin 36 by a lever arm 37 pivotally mounted on a pin 38 mounted in the lower end of the support 35. The lever 37 receives its motion through a roller 39 from a cam 40 mounted on a shaft 41 which is mounted in a bearing 42 on the support 35 and in another bearing of the grid winding machine (not shown).

The pin 30 of the indexing lever 29, 31 is brought into engagement with the plate 28 by means of a lever comprising arms 43, 44, and 45 (Fig. 6), pivotally mounted on a pin 46 which is mounted in a holder 47 mounted on the support 35. The arm 43 consists of a yoke (Fig. 7) which surrounds the bearing portion of the index lever 29, 31 and raises and lowers said lever 29, 31 through pins 48 and a semi-circular collar 49 mounted in a groove 50 in the bearing portion of lever 29, 31. Thus the lever 29, 31 is raised by means of lever arm 45 operated by a cam 51 mounted on the shaft 41, through the arm 43, thereby bringing the pin 30 into engagement with the plate 28. The lever arm 37 (Fig. 16) then moves from the position shown in dot dash lines to that shown in full lines, thereby drawing back the slide 33 and causing the index lever 29, 31 to be rotated through an angle of 45°. The arm 43 now moves down (Fig. 6) to disengage the pin 30 from the plate 28 and the arm 44 moves up to cause a locking pin 52 through links 53 to engage the plate 28, thereby locking the turret 16 through the shaft 24. The pin 52 slides in lugs 54 on the support 35. In its lowered position, the lever 29, 31 is retracted through an angle of 45° and is then in position for another indexing movement. Bolts 55 (Figs. 2 and 7) in lugs 56 on the plate 28 press against a lug 57 on the collar 28' to provide adjustment of said plate 28.

A grid locator is mounted at position B which pushes the grid from the position shown at A further onto the mandrel 13, 14 as shown in Fig. 9. Plates 58 (Fig. 10) located on a block 59 push against the ends of the side rods 10 of the grid. The block 59 is mounted on rod 60 which slides in lugs 61 of the support 62. A rod 63 mounted in the forward lug 61 and sliding in the block 59 prevents rotation of the rod 60. The rod 60 is reciprocated through a block 64 slidably mounted on the rod 60, which block 64 coacts with collars 65 and 66 mounted on the rod 60. In moving forward, the block 64 comes up against the collar 65, thereby pushing the rod 60, with the plate 58, ahead, against a spring 66' which provides a resilient movement. The block 64 has a pin 67 on each side which engages the yoked end of a lever 68 pivotally mounted on a pin 69 in the support 62. The lower arm of lever 68 is actuated through a rod 69' and a lever 70, mounted on a pin 71 in a support 72 mounted on a lug 73 of the table 27, by a cam 74 mounted on a shaft 41. A spring 75 maintains the roller 76 on the lever 70 against the cam 74.

As the plate 58 of the grid locator starts to retract, the fingers 13, 14 (Fig. 3) are separated by the action of a lever 77 (Figs. 8 and 1) of a grid spreader. Said lever 77, pivotally mounted on a pin 78 in a support 79 mounted on the table 27, is actuated through its lower arm by a rod 80 through an arm 81 of a lever pivotally mounted on a pin 82 in a support 83 mounted on a lug 84 on the table 27. An arm 85 carries a roller 86 which is guided by a cam 87 mounted on the shaft 41. The lever 77 moves into the position shown by dot dash lines (Fig. 8) against a roller 88 mounted on an arm 89 of the indexing head pivotally mounted on a pin 90 (Fig. 3). Said arm 89 is connected to an arm 91 through bolts 92 which are provided for adjustment. An arm 93, comprising a lever with arm 91, is forced up by the movement of the arm 89, carrying a link 94 with it, and said link 94, being pivotally mounted on a pin 95 in the arm 18, swings said arm 18 to the left in Fig. 3, bringing it to the position shown in Fig. 2, thereby forcing apart the fingers 13, 14 to cause the grid to assume the shape shown in Fig. 5. This action actually stretches the grid wire 11 so that it is given a permanent set in that position.

The turret 16 then indexes, carrying the indexing head to position C. A tongue 96 (Figs. 1 and 11) moves forward to enter the space between the fingers 13, 14 as shown in Fig. 12. Referring to Fig. 11, the tongue 96 is mounted on a rack 97 which moves in a support 98. Said rack 97 is reciprocated by a gear segment 99 mounted on a shaft 100 which is mounted in the support 98 and a bearing 101 (Fig. 1) mounted on the table 27. An arm 102 mounted on the shaft 100 drives the segment 99 through a rod 103 and a lever 104 mounted on a pin 105 which is mounted in the holder 47 (Fig. 2). The lever 104 is actuated through a roller 105' by a cam 106 mounted on the shaft 41. At the same time the tongue 96 moves forward, a support 107 (Figs. 1, 14 and 15) of a side rod squeeze, pivotally mounted on pins 108 in bearings 109 mounted on the table 27, is rotated from the position shown by dot dash lines in Fig. 14, to that shown by the full lines. Said support 107 is rotated by an arm 110 mounted on one of the pins 108, and a rod 109', through the lever 104 and cam 106. In the upright position of support 107 a bolt 111, in a lug 112 on said support, rests on the table 27. A pair of jaws 113, 114 now draw together, and the side rods 10 of the grid 10, 11 are squeezed and set straight between said jaws 113, 114 and the fingers 13, 14, with the tongue 96 serving to maintain said fingers in position during the squeezing. The jaws 113, 114, slidably mounted in the support 107, are actuated by the links 115, 116 respectively which form a toggle joint. The link 115 is pivotally mounted on a pin 117 in the jaw 113, and the link 116 is pivotally mounted on a pin 118 in a projection 119 of the jaw 114. A pin 120 connects the links at their other ends, the link 115 having a yoke end. A rod 121, having a yoke end which encompasses both links is also mounted on the pin 120 and slides in a guideway 122 of the support 107. The rod 121 is actuated by a rod 123 and a lever 124 mounted on the pin 105. The lever 124 is driven through a roller 125 by a cam 126 mounted on the shaft 41. The rod 121, in moving up, causes the links 115, 116 to straighten out (Fig. 15), thereby pushing out the jaw 113 and pulling in the jaw 114 to accomplish the squeezing operation. After the jaws have been opened the support 107 (Fig. 14) again swings back to allow the indexing head to pass.

No operation is performed on the grid at position D. Between the positions D and E is located a grid wire wiper (Figs. 1, 17, and 18). The grids, as they come from the winding machine have a short length of free wire 127 (Fig. 17) projecting past one of the side rods. This length of wire 127 hangs approximately in the position shown in Fig. 17 and the wiper is provided to set this wire substantially horizontal, as shown by the dot dash lines, so that it is in a position to be cut off. The wiper consists of a lever comprising a hook 128 and an arm 129 pivotally mounted on a pin 130 in a support 131. A spring 132 is located between the hook 128 and support 131, and a bolt 133 in the arm 129 is pressed against the support 131 by said spring 132 to render the hook 128 adjustable. The support 131 is mounted on a standard 134 which is mounted on the table 27.

The wire 127 brushes against the hook 128 and is straightened out thereby.

At position E the strand of wire 127 is cut off by the knife blades 135, 136 (Fig. 2) mounted in jaws 137, 138 respectively which are pivotally mounted on a pin 139 in the support 140. The jaw 137 is connected by a pin 141 to an arm 142 of a lever having another arm 143 which is pivotally mounted on a pin 144 which slides in a slot 145 in the support 140. The jaw 138 is connected by a pin 146 to a link 147, the other end of which is also connected to the pin 144. The arm 143 is connected by a pin 148 to a rod 149 which slides in the support 140. The rod 149 is reciprocated by a rod 150 (Fig. 19) and a lever 151 mounted on a pin 152 in a support 153 mounted on a lug 154 on the table 27. A roller 155 on the lever 151 rides on a cam 156 and is held thereto by a spring 157. A receptacle 157' receives the cut off portions of grid wire.

From position A to position E a grid push-off plate 158 (Fig. 2) included in each of the indexing heads, has been held in the retracted position shown in Fig. 2 and at D in Fig. 1. Said push-off plate 158 is mounted on a bar 159 which slides in the index head body 15. A roller 160 mounted at the other end of said bar 159 rides in a cam 161 mounted on the post 26 (Fig. 13). Referring to Fig. 1, the cam 161 is of such shape that the plate 158 is held in the retracted position from A to E, but at F the bar 159 with plate 158 has moved forward and pushed the grid part way off the mandrel 13, 14. At position G the plate 158 moves out past the end of the mandrel 13, 14 so that the grid is pushed off into a receptacle of some kind (not shown). At position H the plate 158 again is retracting and at A it is in the fully retracted position.

Between positions H and A is located a bumper 162 (Figs. 1 and 2). The roller 88 as shown in Fig. 2, strikes said bumper 162 which again places said roller in the position shown in Fig. 3, thus bringing the fingers 13, 14 together so that another grid may be slipped over them.

In operation, a grid comprising side rods 10 and a winding of wire 11 (Figs. 1 and 4) is delivered at position A, Fig. 1, to a mandrel comprising fingers 13, 14, of an indexing head of which 15 is the body portion. The fingers are close together, as shown in Fig. 3. The head 15, mounted on a turret 16 is indexed to position B (Fig. 1) by means of a lever 29, 31 (Figs. 2 and 7) which engages a plate 28 mounted on a vertical shaft 24 which carries the turret 16. At position B the grid 10, 11 is pushed back over the mandrel 13, 14 by plates 58 mounted on a reciprocating rod 60 (Fig. 9). Upon retraction of the rod 60, a lever 77 (Fig. 8) pivoting on a pin 78, comes in contact with a roller 88 of the indexing head and pushes the arm 89 over to the position shown in Fig. 2. This causes the finger 14 to be moved over, thus causing the grid to assume the shape shown in Fig. 5.

The head 15 is next indexed to position C where a tongue 96 (Fig. 11) enters the space between fingers 13, 14. A side rod squeeze comprising a support 107 (Fig. 14) is also pivoted from the position shown by dot dash lines to a substantially vertical position as shown by full lines. Then the jaws 113, 114 (Fig. 15) are moved toward each other and the side rods 10 of the grid are squeezed and straightened between said jaws 113, 114 and the mandrel 13, 14.

At position D no work is done on the grid, but as the indexing from D to E takes place a grid wire wiper comprising a hooked arm 128 (Fig. 17) brushes against the grid to straighten out an end 127 of wire to a substantially horizontal position, as shown by the dot dash lines. At position E, the end 127 is cut off by the knives 135, 136 (Fig. 2) of a trimmer.

From positions A to E, a grid push-off comprising a plate 158 on a rod 159 slidably mounted in the body 15, has been in position behind the grid as shown in Fig. 2 and at D in Fig. 1, due to the shape of a cam 161 which engages a roller 160 mounted at the other end of the rod 159. After passing position E, the push-off plate 158 moves forward until at G the said plate 158 has passed the ends of fingers 13, 14 and pushed the grid off into a receptacle. After passing the position G the plate 158 retracts, until at A it is again fully retracted. Between positions H and A, the roller 88 strikes a bumper 162, which moves said roller 88 back to the position shown in Fig. 3, thereby closing the mandrel 13, 14 so that it is ready to receive another grid.

What I claim as new and desire to secure by Letters Patent of the United States is:

1. In an apparatus for making grids comprising a support wire having a coil of grid wire secured thereto, a mandrel for supporting a grid, a jaw disposed adjacent said mandrel, and means for closing said jaw against said support wire to squeeze and straighten it.

2. In an apparatus for making grids comprising a pair of support wires having a coil of grid wire secured thereto, a mandrel for supporting a grid, a pair of jaws disposed one on each side of said mandrel, and means for closing said jaws against said support wires to squeeze and straighten them.

3. In an apparatus for making grids comprising a plurality of support wires having a coil of grid wire secured thereto, a mandrel comprising a plurality of relatively laterally movable fingers for supporting a grid, mechanism for spreading said fingers to alter the cross-sectional shape of said grid, a plurality of jaws disposed adjacent said mandrel, and means for closing said jaws against said support wires to squeeze and straighten them.

4. In an apparatus for making grids, the combination of a movable carrier having thereon a plurality of heads each carrying a mandrel comprising a plurality of relatively movable fingers, mechanism for intermittently moving said carrier, a ram mounted adjacent to the path of travel of said heads to position cylindrical grids on said mandrels, mechanisms for reciprocating said ram, mechanism for thereafter spreading said fingers to flatten said grids and means for causing said mechanisms to operate in proper time relation.

5. In an apparatus for making grids, the combination of a movable carrier having thereon a plurality of heads each carrying a mandrel comprising a fixed finger and a movable finger, mechanism for intermittently moving said carrier, a ram mounted adjacent to the path of travel of said heads to position cylindrical grids on said mandrels, mechanism for reciprocating said ram, mechanism for thereafter actuating said movable finger to flatten a grid on said mandrel, and means for causing said mechanisms to operate in proper time relation.

6. In an apparatus for making grids, the combination of a movable carrier having thereon a plurality of heads each carrying a mandrel comprising a fixed finger and a movable finger adjacent thereto mounted on a pivotally hinged arm, a downwardly depending lever pivotally mounted on said head and coacting with said arm, mechanism for intermittently moving said carrier, a ram mounted adjacent to the path of travel of said heads to position cylindrical grids on said mandrels, mechanism for reciprocating said ram, a trip lever mounted adjacent to the path of travel of said downwardly depending lever, mechanism for actuating said trip lever to trip said downwardly depending lever thereby moving said arm and said movable finger to flatten a grid on said mandrel, and means for causing said mechanisms to operate in proper time relation.

7. In an apparatus for making grids comprising a coil of wire having a plurality of spaced supporting wires, the combination of a movable carrier having thereon a plurality of heads each carrying a mandrel comprising a plurality of relatively movable fingers, mechanism for intermittently moving said carrier, a ram mounted adjacent to the path of travel of said heads to position cylindrical grids on said mandrels, mechanism for reciprocating said ram, mechanism for thereafter spreading said fingers to flatten said grids, mechanism mounted adjacent to the path of travel of said heads for squeezing and straightening said supporting wires, and means for causing said mechanisms to operate in proper time relation.

8. In an apparatus for making grids comprising a coil of wire having a plurality of spaced supporting wires, the combination of a movable carrier having thereon a plurality of heads each carrying a mandrel comprising a plurality of relatively movable fingers, mechanism for intermittently moving said carrier, a ram mounted adjacent to the path of travel of said heads to position cylindrical grids on said mandrels, mechanism for reciprocating said ram, mechanism for thereafter spreading said fingers to flatten said grids, mechanism mounted adjacent to the path of travel of said heads for squeezing and straightening said supporting wires comprising a tongue and jaws, means for inserting said tongue between said fingers and means for closing said jaws against said supporting wires, and means for causing said mechanisms to operate in proper time relation.

9. In an apparatus for making grids comprising a coil of wire having a plurality of spaced supporting wires, the combination of a movable carrier having thereon a plurality of heads each carrying a mandrel comprising a plurality of relatively movable fingers, mechanism for intermittently moving said carrier, a ram mounted adjacent to the path of travel of said heads to position cylindrical grids on said mandrels, mechanism for reciprocating said ram, mechanism for thereafter spreading said fingers to flatten said grids, mechanism mounted adjacent to the path of travel of said heads for squeezing and straightening said supporting wires, rams mounted on said heads for pushing said grids off said mandrels, mechanism for reciprocating said rams, mechanism for closing said fingers, and means for causing said mechanisms to operate in proper time relation.

10. In an apparatus for making grids comprising a support wire having a coil of grid wire secured thereto, the combination of a rotatable turret, a plurality of radially disposed mandrels spaced around the periphery of said turret, each of said mandrels comprising a plurality of relatively movable fingers adapted to support a cylindrical grid, means for indexing said turret, and mechanism mounted adjacent the path of travel of said turret for spreading said fingers to flatten the grids thereon.

11. In an apparatus for making grids comprising a plurality of spaced supporting wires having the turns of a coil of grid wire secured thereto, the combination of a rotatable turret, a plurality of radially disposed mandrels spaced around the periphery of said turret, each of said mandrels comprising a plurality of relatively movable fingers adapted to support a cylindrical grid, means for indexing said turret, mechanism mounted adjacent the path of travel of said turret for spreading said fingers to flatten the grids thereon, and mechanism at a subsequent indexing position of said turret for squeezing and straightening the supporting wires of said grids comprising a tongue and pivotally mounted jaws, means for reciprocating said tongue radially of said turret to cause it to be inserted between said mandrel fingers, means for pivoting said jaws to a position adjacent said mandrel fingers, and means for closing said jaws against said supporting wires.

12. In an apparatus for making grids comprising a support wire having a coil of grid wire secured thereto, the combination of a rotatable turret, a plurality of radially disposed mandrels spaced around the periphery of said turret, each of said mandrels comprising a plurality of relatively movable fingers adapted to support a cylindrical grid, means for indexing said turret, mechanism mounted adjacent the path of travel of said turret for spreading said fingers to flatten the grids thereon, a cutter disposed adjacent the periphery of said turret at a subsequent indexing position, and means for actuating said cutter to trim off a free length of grid wire extending beyond said support wire of said grid.

13. In an apparatus for making grids comprising a support wire having a coil of grid wire secured thereto, the combination of a rotatable turret, a plurality of radially disposed mandrels spaced around the periphery of said turret, each of said mandrels comprising a plurality of relatively movable fingers adapted to support a cylindrical grid, means for indexing said turret, mechanism mounted adjacent the path of travel of said turret for spreading said fingers to flatten the grids thereon, a cutter disposed adjacent the periphery of said turret at a subsequent indexing position, means for actuating said cutter to trim off a free length of grid wire extending beyond said support wire of said grid, and a grid wire wiper disposed adjacent the path of travel of said mandrels ahead of said cutter for engaging the said free length of grid wire and bending it to a horizontal outwardly extending position for the said trimming operation.

JOHN FLAWS, Jr.